United States Patent
King et al.

(10) Patent No.: US 8,710,118 B2
(45) Date of Patent: Apr. 29, 2014

(54) NANO-PIGMENT INKJET INK COMPOSITION THAT HAS A LOW ODOR AND IS ENVIRONMENTALLY-FRIENDLY

(75) Inventors: Ke-Yung King, Hsinchu (TW); Chia-Kuei Ling, Hsinchu (TW); Hsiu-hui Liu, Hsinchu (TW); Hsueh-Chun Wu, Hsinchu (TW)

(73) Assignee: Jetbest Corporation, Hsinchu (TW)

( * ) Notice: Subject to any disclaimer, the term of this patent is extended or adjusted under 35 U.S.C. 154(b) by 42 days.

(21) Appl. No.: 13/475,266

(22) Filed: May 18, 2012

(65) Prior Publication Data
US 2013/0190421 A1 Jul. 25, 2013

(30) Foreign Application Priority Data
Jan. 20, 2012 (TW) .............................. 101102405 A

(51) Int. Cl.
*C09D 11/00* (2014.01)
(52) U.S. Cl.
USPC .... 523/160; 106/31.6; 106/31.86; 106/31.28; 523/102
(58) Field of Classification Search
None
See application file for complete search history.

(56) References Cited

U.S. PATENT DOCUMENTS

| 5,371,279 | A | 12/1994 | Qi et al. | |
| 6,543,888 | B2 * | 4/2003 | Nishita | 347/98 |
| 7,125,447 | B2 | 10/2006 | Sugita et al. | |
| 2004/0266907 | A1 * | 12/2004 | Sugita et al. | 523/160 |
| 2005/0148689 | A1 | 7/2005 | Mizutani et al. | |
| 2009/0139432 | A1 * | 6/2009 | Shikata et al. | 106/31.13 |

FOREIGN PATENT DOCUMENTS

| EP | 2284226 A1 | 2/2011 |
| WO | 2010133889 A2 | 11/2010 |

\* cited by examiner

*Primary Examiner* — James J Seidleck
*Assistant Examiner* — Peter A Salamon
(74) *Attorney, Agent, or Firm* — Rabin & Berdo, P.C.

(57) ABSTRACT

A nano-pigment inkjet ink composition that has a low odor and is environmentally-friendly includes, based on total weight of the inkjet ink composition, from 1 to 10 percent by weight of N-ethyl pyrrolidone; from 1 to 20 percent by weight of propylene carbonate; from 50 to 80 percent by weight of a glycol ether solvent; a pigment that is a nano-pigment having a nano-particle size; a dispersant; a resin; a plasticizer; a surfactant; and from 0.1 to 3.0 percent by weight of an acidity regulator that is at least one cyclic tertiary amine compound. This inkjet ink composition meets both environmental and print quality requirements. The composition has a high flash point and includes raw materials having low toxicity and low odor. It has good storage stability, inkjet stability, and good print quality. Printhead nozzles are not easily clogged. The printed image has high gloss, scratch resistance, and weather resistance.

17 Claims, No Drawings

NANO-PIGMENT INKJET INK COMPOSITION THAT HAS A LOW ODOR AND IS ENVIRONMENTALLY-FRIENDLY

BACKGROUND OF THE INVENTION

1. Field of the Invention

The present invention relates to an inkjet ink composition, and more particularly relates to a low odor environmentally-friendly nano-pigment inkjet ink composition applied to the solvent-based piezo inkjet printer. The inkjet ink composition contains low odor and low toxic solvent but without containing any hazardous substances. The inkjet ink composition has good storage stability and inkjet stability, and the printed image has the properties of high gloss, abrasion resistance, and weather resistance, and also the printhead nozzles are not easily clogged by such an inkjet ink composition. The inkjet ink composition can meet both the environmental requirement and the print quality requirement.

2. The Prior Arts

Digital inkjet printer is controlled by a software system, in which the ink is ejected onto the printing substrate to form the words or the images. Nowadays, two fundamentally different types of printheads for inkjet printing are piezoelectric and thermal-bubble types based on the working mechanism of the nozzles. Commonly, piezoelectric inkjet printheads include one or more fluid chambers, engineered to deform during the application of an external voltage. Typically, this deformation decreases the chamber's volume, which causes a droplet of ink to be ejected through the nozzles at one end of the fluid chamber, and the ejected ink droplets can be precisely controlled to have the desired shapes and the right flying directions. Strong shear force will be produced when the ink goes through the narrow fluid chamber, and thereby the ink with low viscosity is required so that the ink commonly contains a large amount of solvent. The inkjet inks can be broadly divided into water-based inks, oil-based inks, and UV curable inks The oil-based pigment ink is directly ejected onto polyvinyl chloride (PVC) material and applied to the outdoor large advertising boards, and the oil-based pigment ink can be divided into solvent-based ink, mild solvent-based ink, and ECO-solvent-based ink.

The solvent-based inks are usually very corrosive, which allows them to penetrate uncoated PVC substrate, and thereby have good adhesion to the substrate, and the printed images have high resolution. The solvents used in the solvent-based inks include the strongly corrosive ketones such as cyclohexanone, isophorone, and thus such solvents are hazardous for human and environment.

The mild esters are used in the mild solvent-based inks stead of ketones, and the mild esters include ethylene glycol monobutyl ether acetate and diethylene glycol monobutyl ether acetate. The above esters have the following advantages: good dispersion to pigment, short grinding time, making pigment to have good color development performance and high gloss, and thus they become the first choice to disperse the pigment ink. However, the above esters have the disadvantages of fast evaporation rate and strong odor. U.S. Pat. No. 5,371,279 disclosed that ethylene glycol monobutyl ether acetate will be decomposed into acidic substances under high humidity environment. US Pat. App. No. 2009/0,139,432 A1 disclosed that alcohol amine was added for preventing the formation of the acidic substances which can cause the corrosion of nozzles, and consequently the ink miss-ejection and oblique ejection will occur, and thereby the printing quality is poor. EP Pat. No. 2284226 A1 disclosed the corrosion problem for an ink, and cyclohexylamine and imidazole as acidity regulator are used, but they are toxic and corrosive, which can cause the operation safety problem.

Glycol ethers (such as diethylene glycol diethyl ether) are used in the environment-friendly inks as main solvent. The glycol ethers have the advantages of low toxicity, no odor and high security, and have the disadvantages of low boiling point, the formation of a large amount of volatile organic compound (VOCs) gases, low polarity, poor solubility for polymer, and poor dispersivity. In addition, the serious bleeding phenomenon and the blockage of the nozzles occur due to the low surface tension of the solvent. Because of no corrosion to the PVC material, the above solvents must be used with the other appropriate solvents or additives to improve the surface tension of the ink and corrosion to the substrates. WO Pat. App. No. 2010/133889A2 disclosed that 25-45% of propylene carbonate was added to glycol ether to reduce the amount of the volatile organic compounds in the ink, but if propylene carbonate is added over a certain limit, the drying rate of the printed image will become slow so that the printing speed cannot be improved. U.S. Pat. No. 7,125,447B2 disclosed that the addition of the γ-butyrolactone solvent to the glycol ether solvent contained in the oil-based inkjet ink can improve the penetration to the PVC material, and increase the leveling and the drying rate of ink. However, according to the latest CLP/GHS Annex VI to Regulation (EC) No. 1272/2008, the safety of γ-Butyrolactone is changed from the original warning label of R22 (harmful by inhalation) and R36 (eye irritation) to R22 (harmful by inhalation) and R41 (serious eye injury) and R67 (vapors may cause drowsiness and dizziness). US Pat. App. 2005/0148689A1 disclosed that glycol ether solvent with 1-30% of N-methyl pyrrolidone or N-ethyl pyrrolidone has low odor and is easily soluble to the PVC material. According to the EU REACH regulation, N-methyl pyrrolidone appears to affect the fecundity of females and is identified as substances of very high concern (SVHC). Furthermore, the nozzles can be dissolved and damaged by a large amount of high polar pyrrolidone solvents. The PVC material can be highly corroded by the ketone and ester solvents, and the ketone and ester solvents have heavy odor and low safety. Moreover, with the change of chemical safety regulations, it becomes very difficult to choose an appropriate solvent for improving the safety and the resolution of the ink.

SUMMARY OF THE INVENTION

To overcome the above disadvantages of the prior art, the objective of the present invention is to provide a low odor environmentally-friendly nano-pigment inkjet ink composition, which includes 1 to 10% N-ethyl pyrrolidone, 1 to 20% propylene carbonate, 50 to 80% of glycol ether solvent, a pigment, a dispersant, a resin, a plasticizer, a surfactant, and a cyclic tertiary amine compound as an acidity regulator.

In order to achieve the above objective, N-ethyl pyrrolidone and propylene carbonate are used in the inkjet ink composition of the present invention instead of γ-butyrolactone. N-ethyl pyrrolidone and propylene carbonate can adjust the surface tension of inkjet ink, increase the solubility to the PVC material, improve the inkjet fluency, leveling and drying rate of inkjet ink, and provide a safe working environment with high boiling point and low vapor pressure. N-ethyl pyrrolidone has a good solubility to the PVC material, and N-ethyl pyrrolidone has a surface tension of 39 dyne/cm, and a vapor pressure of less than 1.0 hPa at the temperature of 20° C. Propylene carbonate has a surface tension of 42 dyne/cm and a vapor pressure of 0.17 hPa at the temperature of 20° C. To adjust the surface tension of the inkjet ink composition and to improve the inkjet fluency and leveling and print resolution of the inkjet ink composition, the ratio of N-ethyl pyrrolidone and propylene carbonate can be adjusted so that N-ethyl pyrrolidone and propylene carbonate can reach the same effect as γ-butyrolactone. N-ethyl pyrrolidone and propylene carbonate having the flash point of over 90° C. can reduce the amount of volatile organic compounds and increase the flash point of the inkjet ink composition. N-ethyl pyrrolidone and propylene carbonate has no pungent odor and no danger of safety. N-ethyl pyrrolidone is present in an amount of from 1 to 10 percent by weight, preferably from 5 to 10 percent by weight, based on the total weight of the inkjet ink composition. Propylene carbonate is present in an amount of from 1 to 20 percent by weight, preferably 5 to 15% by weight, based on the total weight of inkjet ink composition, the total weight of the inkjet ink composition The acidity regulator used in the present invention includes tertiary amine piperidine, tertiary amine piperidinol, tertiary amine piperidone, tertiary amine pyrrolidine, tertiary amine pyrrolidinol, tertiary amine pyrrolidone, tertiary amine piperazine compound. The acidity regulator is present in an amount of from 0.1 to 3.0 percent by weight of the total weight of the inkjet ink composition. The acidity regulator can further include ethyl 1-methyl-piperidine-3-carboxylate, 1-(2-hydroxyethyl)-4-(3-hydroxypropyl)piperidine, 3-(1-piperidinylmethyl)phenol, 1-methyl-3-piperidinemethanol, 4,4'-trimethylene bis(1-piperidine ethanol), N-methyl-3-piperidinol, N-ethyl-3-piperidinol, 4-acetamido-1-benzylpiperidine, 1-methyl-2-piperidinemethanol, 1-(2-hydroxyethyl)piperidine, ethyl 1-piperidinepropionate, 1-piperidinepentanol, tropine, 1-(2-hydroxyethyl)-2,2,6,6-tetramethyl-4-piperidinol, 4-hydroxy-1,2,2,6,6,-pentamethylpiperidine, N-methyl-4-piperidone, N-ethyl-4-piperidone, 1-(2-phenylethyl)-4-piperidone, 1-benzyl-4-piperidone, 1,3-dimethyl-4-piperidone, tropanone, 1-(2-hydroxyethyl)pyrrolidine, 3-(dimethylamino)pyrrolidine, 1-pyrrolidino-1-cyclopentene, 1-pyrrolidino-1-cyclohexene, 1-ethyl-3-pyrrolidinol, 1-isopropyl-3-pyrrolidinol, 1-benzyl-3-pyrrolidone, and 1-acetyl-4-(4-hydroxyphenyl)piperazine. The above-mentioned compounds can be used alone or in combination of two or more. The pH value of water extraction from the inkjet ink composition is between 6.0 and 9.0, by using the above acidity regulator.

The glycol ether solvent is used as the main solvent for manufacturing the inkjet ink composition of the present invention, wherein the glycol ether solvent is represented by the following general formula (1) or (2):

$$R_1\text{—}O(CH_2CH\text{—}R_2O)_n\text{—}R_3 \quad (1)$$

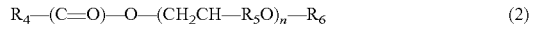

$$R_4\text{—}(C=O)\text{—}O\text{—}(CH_2CH\text{—}R_5O)_n\text{—}R_6 \quad (2)$$

wherein, $R_1$, $R_2$, $R_3$, $R_4$, $R_5$, and $R_6$ are each independently hydrogen atoms or alkyl groups, and n is an integer from 2 to 5.

The glycol ether solvent used in the present invention includes ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monopropyl ether, propylene glycol monobutyl ether, propylene glycol monoisobutyl ether, dipropylene glycol monomethyl ether, dipropylene glycol dimethyl ether, dipropylene glycol monobutyl ether, dipropylene glycol isobutyl ether, dipropylene glycol monomethyl ether, diethylene glycol dibutyl ether, diethylene glycol diethyl ether, diethylene glycol ethyl methyl ether, tetraethylene glycol dimethyl ether, dipropylene glycol dimethyl ether, propylene glycol monomethyl ether acetate, dipropylene glycol monomethyl ether acetate, ethylene glycol monobutyl ether acetate, diethylene glycol monobutyl ether acetate, wherein dipropylene glycol monomethyl ether, diethylene glycol diethyl ether, diethylene glycol ethyl methyl ether, and tetraethylene glycol dimethyl ether. These glycol ether solvents have low odor and are very suitable for use in the inkjet ink composition. The glycol ether solvent is present in an amount of from 50 to 80 percent by weight, preferably from 60 to 75 percent by weight, based on the total weight of the inkjet ink composition.

The resin is used for adjusting the ink viscosity to comply with the requirement of the various nozzles. Also, the resin is used for increasing adhesion to the substrate, and scratch resistance, abrasion resistance, water proofing and brightness of the ink, and weather resistance of the pigments, and meanwhile maintaining the pigment dispersibility in a solvent. In addition, in order to avoid the occurrence of oblique ejection or permanent blockage of the nozzles due to the formation of the hardened resin film after ink evaporation, the plasticizer must be used with the resin together to make the resin film to be flexible and re-dissolvable. The resin used in the present invention includes polyvinyl acetate resin, polyamide resin, polyacrylic resin, epoxy resin, phenol resin, aldehyde ketone resin, phenolic resin, polyester resin, and cellulose resin. The above-mentioned resins can be used alone or in combination of two or more. To achieve the best adhesion onto the PVC material, the polyvinyl acetate resin is preferred. The resin used in the present invention has a molecular weight of 5,000 to 100,000, and preferably 10,000 to 60,000, and has a glass transition temperature ($T_g$) of 40 to 80° C. The resin used in the present invention includes, for example, the vinyl resin series by polymerizing UCAR™ solution (available from DOW CHEMICAL) such as VYHH, VYNS-3, VYNC-P, VMCH, VAGD, VAGF, VAGC, VAGH, VYLF-X, VROH, VERR-40, VMCA; and the VINNOL® coating resin series (available from WACKER) such as E15/40A, E15/45, E15/45M, E15/48A, E20/45, E22/48A, H11/59, H14/36, H15/42, H15/45M, H15/50, H40/50, H40/55, H40/60, H30/48M, H40/43. The above resins can be used alone or in combination of two or more depending on the desired scratch resistance, water proofing and brightness. Moreover, the plasticizer used in the present invention includes phthalate ester, alkyl sulfonic acid phenol ester, adipic acid ester, sunflower acid ester, castor oil, phosphate ester, and citric acid ester. The environmentally-friendly plasticizer is preferably used, such as tributyl citrate, acetyl tributyl citrate, or diisononyl adipate. The plasticizer should be present in an amount of about 0.01 to 5 times of the amount of a resin by weight, so that the resin film formed can be completely re-dissolved to the ink. As a result, even if the high-volatile solvent is used in the inkjet ink composition, the inkjet ink composition at the nozzles is still softened under high pressure and high temperature, and thus the blockage of the nozzles can be avoided. The inkjet ink composition is hardened at room temperature to provide scratch resistance and water proofing. According to the different substrates, the plasticizer is used with the resin together to make the resin film formed to be flexible and re-dissolvable.

In the present invention, the initial particle size of the pigment is 50 to 500 nm, preferably 50 to 200 nm. The dispersant is commercially available and has a solubility coefficient to the organic solvent of 8 to 11. The dispersant used in the present invention includes DISPERBYK® series (available from BYK CHEMIE): BYK-161, BYK-162, BYK-167, BYK-168, BYK-2000, BYK-2164; Solsperse® series (available from Lubrizol): Solsperse-32000, Solsperse- 32500, Solsperse-35100, Solsperse-37500, Solsperse-71000, Solsperse-76500; TEGO® Dispers series (available from Evonik): TEGO Dispers-650, TEGO Dispers-651, TEGO Dispers-652, TEGO Dispers-655, TEGO Dispers-670, TEGO Dispers-685, TEGO Dispers-710. The dispersant is present in an amount of about 0.1 to 2 times, preferably 0.2 to 0.8 time of the amount of the pigment by weight. The white or colored, organic or inorganic pigments can be used in the present invention. The pigment includes titanium dioxide, anthraquinone, pyrimidine, diketone pyrrol pyrrole, benzimidazolone, azo pigments, phthalocyanine pigments, (indole) iso-ketone pigments, (quinoline acridine) ketone pigments, dioxin (triazine) pigments, indanthrone pigments, perylene pigments, perylene ketone pigments, sulfur indigo pigments, quinone ketone pigments, or metal complex pigments. The colors of the pigment include Yellow 1, Yellow 3, Yellow 12, Yellow 13, Yellow 14, Yellow 17, Yellow 65, Yellow 73, Yellow 74, Yellow 75, Yellow 81, Yellow 83, Yellow 97, Yellow 126, Yellow 127, Yellow 139, Yellow 150, Yellow 151, Yellow 154, Yellow 174, Yellow 176, Yellow 180, Yellow 183, Yellow 188, Orange 5, Orange 13, Orange 16, Orange 34, Orange 36, Red 2, Red 3, Red 4, Red 8, Red 9, Red 12, Red 14, Red 21, Red 22, Red 23, Red 31, Red 48:1, Red 48:2, Red 48:3, Red 48:4, Red 49:1, Red 49:2, Red 52:1, Red 52:2, Red 53:1, Red 53:3, Red 57:1, Red 63:1, Red 81, Red 112, Red 122, Red 144, Red 146, Red 166, Red 170, Red 171, Red 175, Red 176, Red 177, Red 179, Red 184, Red 185, Red 208, Red 210, Red 243, Red 266, Violet 1, Violet 3, Violet 19, Violet 23, Violet 27, Blue 1, Blue 15:1, Blue 15:2, Blue 15:3, Blue 15:4, Blue 56, Blue 61, Green 7, and Black 7. The inorganic pigment includes Pigment Yellow 32, Pigment Yellow 34, Pigment Yellow 36, Pigment Yellow 42, Pigment Red 101, Pigment Red 104, Pigment Blue 27, Pigment Blue 29, Pigment Green 17, Pigment Black 11, and Pigment Orange 21. The above pigments can be used alone or in combination of two or more. The known dispersing method can be used, which include the following steps: rapidly mixing the above pigments in a mixer after addition; milling in a ball mill, a roller mill, a ball grinder, a sander, or a needle-shaped grinder; removing the large particles and the insoluble substances by centrifugal separation or filtration; and determining the quality of the dispersed pigments by the particle size analyzer.

The surfactant is used to adjust the surface tension and the antifoaming property of the ink. The ink can have good coating effect when the surface tension of the ink is lower than that of the substrate. In the present invention, the surface tension is in the range of 25 to 40 dyme/cm, preferably in the range of 28 to 30 dyme/cm. The surfactant used in the present invention includes TEGO® Wet KL 245, Wet 250, Wet 260, Wet 265, Wet 270, Wet 280; Perenol® F3, F40, F41, F45, S4, S43; CoatOsil® 1211, 1300, 1706, 1757, 1770, 2400, 2810, 3500, 3501, 3503, 3505, 3509, 3573; Ciba® Ciba EFKA® 3030, 3033, 3232, 3288, 3600, 3777, 3883; and BYK® 141, 302, 307, 310, 331, 333, 337, 410, 1752, 9077. The above surfactants can be used alone or in combination of two or more. Moreover, an ultraviolet absorber (such as benzophenone, benzotriazole, phenol) or an antioxidant (such as butyl hydroxyl anisole (BHA), butylated hydroxyl toluene (BHT)) can be added to the ink, which can effectively reduce the damage of ultraviolet light on the pigment and prevent the resin from oxidizing and going sou. The ultraviolet absorber or the antioxidant is present in an amount of from 0.1 to 3 percent by weight of the total weight of the inkjet ink composition.

The orifices of the nozzles are susceptible to be damaged by the chemical substances in the inkjet ink composition, which can cause the ink oblique ejection, and the blockage of the nozzles. Due to the moisture in the environment, the ink components, such as solvent, resin, etc., can be hydrolyzed into the acidic substances which can react with the coating on the nozzles, and cause the peeling of the coating. Therefore, the acidity regulator is required to be added to the inkjet ink composition. The conventional acidity regulator is alcohol amine or an imidazole compound having high toxicity and corrosivity. Except for the concerns of the operation safety, an alcohol amine or an imidazole compound can compete with the dispersant for reacting to the pigment, which cause the instability of pigment in the dispersion. The cyclic tertiary amine compound used in the present invention is less corrosive and less chemically toxic. The acidity regulator cannot compete with the dispersant for reacting to the pigment due to the large steric hindrance of the ring structure. Accordingly, the stability of the ink storage is enhanced and pH value of the water extraction from the ink is effectively maintained in the range of 6 to 9, preferably 7 to 8. The cyclic tertiary amine used in the present invention includes piperidine, piperidinol, piperidone, pyrrolidine, pyrrolidinol, pyrrolidinone and piperazine. Specifically, the acidity regulator includes ethyl 1-methyl-piperidine-3-carboxylate, 1-(2-hydroxyethyl)-4-(3-hydroxypropyl)piperidine, 3-(1-piperidinylmethyl)phenol, 1-methyl-3-piperidinemethanol, 4,4'-trimethylene bis(1-piperidine ethanol), N-methyl-3-piperidinol, N-ethyl-3-piperidinol, 4-acetamido-1-benzylpiperidine, 1-methyl-2-piperidinemethanol, 1-(2-hydroxyethyl)piperidine, ethyl 1-piperidinepropionate, 1-piperidinepentanol, tropine, 1-(2-hydroxyethyl)-2,2,6,6-tetramethyl-4-piperidinol, 4-hydroxy-1,2,2,6,6,-pentamethylpiperidine, N-methyl-4-piperidone, N-ethyl-4-piperidone, 1-(2-phenylethyl)-4-piperidone, 1-benzyl-4-piperidone, 1,3-dimethyl-4-piperidone, tropanone, 1-(2-hydroxyethyl)pyrrolidine, 3-(dimethylamino) pyrrolidine, 1-pyrrolidino-1-cyclopentene, 1-pyrrolidino-1-cyclohexene, 1-ethyl-3-pyrrolidinol, 1-isopropyl-3-pyrrolidinol, 1-benzyl-3-pyrrolidone, and 1-acetyl-4-(4-hydroxyphenyl)piperazine. The above acidity regulators can be used alone or in combination of two or more. The acidity regulator is present in an amount of from 0.1 to 3 percent by weight, preferably from 0.1 to 1 percent by weight, based on the total weight of the inkjet ink composition.

For the above low odor environmentally-friendly nano-pigment inkjet ink composition, the flash point of the ink is more than 60° C. under the atmospheric pressure and can be printed onto PVC substrates.

For the above low odor environmentally-friendly nano-pigment inkjet ink composition, the viscosity at the temperature of 25° C. is between 3.0 to 20 cps, and the surface tension is between 25 to 40 dyne/cm, preferably between 28 to 30 dyne/cm.

DETAILED DESCRIPTION OF THE PREFERRED EMBODIMENT

The present invention is further understood by referring to the following embodiments. The following embodiment is only preferred embodiments and can not used to limit the claimed range of the present invention.

Preparation of Nano-Pigment Dispersion:

20 percent by weight of carbon black (Japanese Mitsubishi Chemical, MA-100R) and 12 percent by weight of dispersant (Germany Evonik company, TEGO Dispers-652) are added to 68 percent by weight of diethylene glycol diethyl ether and followed by mixing for one hour at 500rpm of rotational speed with a high-speed dispersion machine, and then 50% by volume of zirconia beads (2.0 mm) are added to the above mixture, and then the resultant mixture is pre-dispersed in a ball mill, and the coarse grinded pigment has the average particle diameter of less than 1 µm. Thereafter, the pigment dispersion is further dispersed in a nano-grinder. After the filtering step, the black pigment dispersion is obtained, and the black pigment in the black pigment dispersion has the average particle diameter of about 80 nm, and the black pigment dispersion has a viscosity of 10 cps.

15 percent by weight of C.I. Pigment Y150 (Germany Bayer Corporation, Yellow E4GN) and 6 percent by weight of dispersant (Germany Lubrizol Corporation, S76500) are added to 78 percent by weight of diethylene glycol diethyl ether and followed by mixing for one hour at 500rpm of rotational speed with a high-speed dispersion machine, and then 50% by volume of zirconia beads (2.0 mm) are added to the above mixture, and then the resultant mixture is pre-dispersed in a ball mill, and the coarse grinded pigment has the average particle diameter of less than 1 µm. Thereafter, the pigment dispersion is further dispersed in a nano-grinder. After the filtering step, the yellow pigment dispersion is obtained, and the yellow pigment in the yellow pigment dispersion has the average particle diameter of about 150 nm, and the yellow pigment dispersion has a viscosity of 20 cps.

15 percent by weight of C.I. Pigment R122 (Japanese DIC Corporation, Magenta RG) and 6 percent by weight of dispersant (Germany Lubrizol Corporation, S32000) are added to 78 percent by weight of diethylene glycol diethyl ether and followed by mixing for one hour at 500 rpm of rotational speed with a high-speed dispersion machine, and then 50% by volume of zirconia beads (2.0 mm) are added to the above mixture, and then the resultant mixture is pre-dispersed in a ball mill, and the coarse grinded pigment has the average particle diameter of less than 1 µm. Thereafter, the pigment dispersion is further dispersed in a nano-grinder. After the filtering step, the red pigment dispersion is obtained, and the red pigment in the red pigment dispersion has the average particle diameter of about 120 nm, and the red pigment dispersion has a viscosity of 10 cps.

20 percent by weight of C.I. Pigment Blue 15:3 (Japanese DIC Corporation, Blue 5412SD) and 12 percent by weight of dispersant (Germany Chemie, BYK-2164) are added to 68 percent by weight of diethylene glycol diethyl ether and followed by mixing for one hour at 500 rpm of rotational speed with a high-speed dispersion machine, and then 50% by volume of zirconia beads (2.0 mm) are added to the above mixture, and then the resultant mixture is pre-dispersed in a ball mill, and the coarse grinded pigment has the average particle diameter of less than 1 µm. Thereafter, the pigment dispersion is further dispersed in a nano-grinder. After the filtering step, the blue pigment dispersion is obtained, and the blue pigment in the blue pigment dispersion has the average particle diameter of about 120 nm, and the blue pigment dispersion has a viscosity of 15 cps.

The embodiments of the low odor environmentally-friendly nano-pigment inkjet ink compositions of the present invention are shown in the following Table 1.

TABLE 1

| | Raw Material | | | | | | | | | | | |
|---|---|---|---|---|---|---|---|---|---|---|---|---|
| | Sample 1 | Sample 2 | Sample 3 | Sample 4 | Sample 5 | Sample 6 | Sample 7 | Sample 8 | Sample 9 | Sample 10 | Sample 11 | Sample 12 |
| Black Pigment Dispersion | 20 | 20 | 20 | — | — | — | — | — | — | — | — | — |
| Yellow Pigment Dispersion | — | — | — | 20 | 20 | 20 | — | — | — | — | — | — |
| Magenta Pigment Dispersion | — | — | — | — | — | — | 20 | 20 | 20 | — | — | — |
| Cyan Pigment Dispersion | — | — | — | — | — | — | — | — | — | 20 | 20 | 20 |
| N-Ethyl Pyrrolidone | 8 | 8 | 8 | 8 | 8 | 8 | 8 | 8 | 8 | 8 | 8 | 8 |
| Propylene Carbonate | 12 | 12 | 12 | 12 | 12 | 12 | 12 | 12 | 12 | 12 | 12 | 12 |
| Diethylene Glycol Ethyl Methyl Ether | 45 | 45 | 45 | 47 | 47 | 47 | 47 | 47 | 47 | 45 | 45 | 45 |
| Tetraethylene Glycol Dimethyl Ether | 6 | 6 | 6 | 6 | 6 | 6 | 6 | 6 | 6 | 6 | 6 | 6 |
| PVAc Resin | 4 | 4 | 4 | 3 | 3 | 3 | 3 | 3 | 3 | 4 | 4 | 4 |
| Adipate Di-isononyl Ester | 4.4 | 4.4 | 4.4 | 3.4 | 3.4 | 3.4 | 3.4 | 3.4 | 3.4 | 4.4 | 4.4 | 4.4 |
| 1-(2-Hydroxyethyl) Piperidine | 0.5 | — | — | 0.5 | — | — | 0.5 | — | — | 0.5 | — | — |
| N-Ethyl-4-piperidone | — | 0.5 | — | — | 0.5 | — | — | 0.5 | — | — | 0.5 | — |
| 1-Methyl-2-piperidine Methanol | — | — | 0.5 | — | — | 0.5 | — | — | 0.5 | — | — | 0.5 |
| Surfactant | 0.1 | 0.1 | 0.1 | 0.1 | 0.1 | 0.1 | 0.1 | 0.1 | 0.1 | 0.1 | 0.1 | 0.1 |
| Viscosity(25° C., cps) | 4.4 | 4.5 | 4.4 | 4.6 | 4.7 | 4.6 | 4.5 | 4.6 | 4.5 | 4.5 | 4.6 | 4.5 |
| Surface Tension (dyne/cm) | 29.9 | 29.8 | 29.9 | 29.8 | 29.9 | 29.8 | 29.9 | 29.9 | 29.8 | 29.8 | 29.9 | 29.8 |
| Average Particle Size (nm) | 99 | 103 | 101 | 112 | 110 | 115 | 132 | 134 | 129 | 122 | 127 | 126 |
| pH Value of Water Extraction | 7.9 | 8.2 | 8.2 | 7.8 | 8.1 | 8.0 | 7.8 | 8.2 | 8.1 | 7.9 | 8.2 | 8.2 |

Evaluation Tests for the Inkjet Ink Compositions:

1. Viscosity test for the inkjet ink composition: Brookfield DV-E type rotating viscometer is used, and the temperature is controlled at 25° C.

2. Surface tension test for the inkjet ink composition: CBVP-A3 type surface tensiometer manufactured by Japanese Union Interface Science Co., Ltd is used.

3. Particle size test for the inkjet ink composition: LA-950 type particle diameter analyzer manufactured by HORIBA STEC Co., Ltd. is used, and the average particle diameter of the ink, D50 and D90 (nm) are determined.

4. pH value test for the inkjet ink composition: the inkjet ink composition is stored in a constant-temperature oven at 45° C. for eight weeks, and 15 g of the inkjet ink composition is taken out every two weeks, and 85 g of the distilled water is added to the inkjet ink composition taken out, followed by stirring at the room temperature for 30 minutes, filtering and collecting the filtrate, measuring the pH value of the filtrate for eight weeks, and recording the pH value variation of the filtrate.

Evaluation A: pH value is larger than 7;
Evaluation B: pH value is 6 and 7; and
Evaluation C: pH value is smaller than 6.

5. High-temperature stability test for the inkjet ink composition: the inkjet ink composition is placed in a jar and kept at constant temperature of 45° C. for eight weeks, and then restored to the room temperature. Thereafter, the viscosity and the particle size of the inkjet ink composition are measured.

Evaluation A: the variations of ink viscosity and particle size are smaller than 5%;
Evaluation B: the variations of ink viscosity and particle size are smaller than 10%;
Evaluation C: the variations of ink viscosity and particle size are larger than 10%.

6. Low-temperature stability test for the inkjet ink composition: the inkjet ink composition is placed in a jar and kept at constant temperature of 10° C. below zero for eight weeks, and then restored to the room temperature. Thereafter, the viscosity and the particle size of the inkjet ink composition are measured.
Evaluation A: the variations of ink viscosity and particle size are smaller than 5%;
Evaluation B: the variations of ink viscosity and particle size are smaller than 10%;
Evaluation C: the variations of ink viscosity and particle size are larger than 10%.

7. Printing stability test for the inkjet ink composition: Epson DX 5 print head is used for continuous printing, and the occurrence of the ink miss-ejection, oblique ejection, or misting is observed.
Evaluation A: during 12 hours of continuous printing test, the ink miss-ejection, oblique ejection, or misting occurs for less than 5 times;
Evaluation B: during 12 hours of continuous printing test, the ink miss-ejection, oblique ejection, or misting occurs for 5 to 10 times; and
Evaluation C: during 12 hours of continuous printing test, the ink miss-ejection, oblique ejection, and misting occurs for more than 10 times.

8. Nozzle test for the inkjet ink composition: Epson DX 5 print head nozzles are used, and the printer is shut down for three days after printing 10 meters, and then the printer is turned on and the cleaning process is started, and then the nozzle test is carried out, and the ink should be completely ejected from the nozzle, and no nozzle clogging and no ink oblique ejection occur. The observation is made for 3 months.
Evaluation A: the ink is completely ejected from the nozzle, and no nozzle clogging and no ink oblique ejection occur;
Evaluation B: the ink is completely ejected from the nozzle, and the ink oblique ejection occurs; and
Evaluation C: the nozzle clogging and the ink oblique ejection occur.

9. Printing performance test for the inkjet ink composition: the line patterns and the cross-color patterns are printed onto the glossy PVC paper.
Evaluation A: no ink bleeding phenomenon occurs, and a clear pattern is printed out;
Evaluation B: little bleeding phenomenon occurs in the heavy ink area, and an acceptable pattern is printed out; and
Evaluation C: serious bleeding phenomenon occurs, and an unclear pattern is printed out;

10. Abrasion resistance test for the inkjet ink composition: a back-and-forth rubbing is carried out on the surface of the printed pattern for 1000 times by using BYK 5005 type abrasion resistance test machine.
Evaluation A: no peeling of the printed pattern is observed, and the printed pattern remains intact;
Evaluation B: the partly peeling of the printed pattern is observed, and the printed pattern is acceptable; and
Evaluation C: the seriously peeling of the printed pattern is observed, and the printed pattern is incomplete.

11. Alcohol resistance test for the inkjet ink composition: Back-and-forth rubbing with 10% alcohol cotton ball is carried out on the surface of the printed pattern for 5 times by using BYK 5005 type abrasion resistance test machine.
Evaluation A: no peeling of the printed pattern is observed, and the printed pattern remains intact;
Evaluation B: the partly peeling of the printed pattern is observed, and the printed pattern is acceptable; and
Evaluation C: the seriously peeling of the printed pattern is observed, and the printed pattern is incomplete.

12. Gloss test for the inkjet ink composition: the gloss of the pattern printed on the glossy PVC paper is determined by using BYK AG-4442 gloss 60 of gloss meter.
Evaluation A: the increase of gloss value is more than 5%;
Evaluation B: the increase of gloss value is less than 5%; and
Evaluation C: no change on the gloss value, or the gloss value is decreased;

13. Drying rate test for the inkjet ink composition: a color pattern is printed onto the glossy PVC paper, and the printed glossy PVC paper is kept at the room temperature for a period of time, and then a white paper is pressed on the color pattern printed on the glossy PVC paper, and the transferred color pattern on the white paper is observed.
Evaluation A: within 5 minutes;
Evaluation B: between 5 to 10 minutes; and
Evaluation C: more than 10 minutes.

14. Odor test for the inkjet ink composition: 20 ml of the inkjet ink composition is placed into a glass beaker, and let 20 peoples smell a sample randomly sampled from 20 ml of the inkjet ink composition.
Evaluation A: no obvious odor is present, and peoples have no discomfortable feeling;
Evaluation B: some odor is present, and the odor is acceptable for peoples; and
Evaluation C: serious pungent odor is present, and peoples feel discomfortable.

The evaluations of the above tests are shown in the following Table 2.

TABLE 2

| | Test Item | | | | | | | | | | | |
|---|---|---|---|---|---|---|---|---|---|---|---|---|
| | Sample 1 | Sample 2 | Sample 3 | Sample 4 | Sample 5 | Sample 6 | Sample 7 | Sample 8 | Sample 9 | Sample 10 | Sample 11 | Sample 12 |
| pH Value Test | A | A | A | A | A | A | A | A | A | A | A | A |
| High-Temperature Stability Test | A | A | A | A | A | A | A | A | B | A | A | A |
| Low-Temperature Stability Test | A | A | A | A | A | A | A | A | A | A | A | A |
| Room-Temperature Printing Stability Test | A | A | A | A | A | A | A | A | A | A | A | A |
| Room-Temperature Nozzle Test | A | A | A | A | A | A | A | A | A | A | A | A |
| Printing Performance Test | A | A | A | A | A | A | A | A | A | A | A | A |

TABLE 2-continued

| | Test Item | | | | | | | | | | | |
|---|---|---|---|---|---|---|---|---|---|---|---|---|
| | Sample 1 | Sample 2 | Sample 3 | Sample 4 | Sample 5 | Sample 6 | Sample 7 | Sample 8 | Sample 9 | Sample 10 | Sample 11 | Sample 12 |
| Abrasion Resistance | A | A | A | A | A | A | A | A | A | A | A | A |
| Alcohol Resistance Test | A | A | A | A | A | A | A | A | A | A | A | A |
| Gloss Test | A | A | A | A | A | A | A | A | A | A | A | A |
| Drying Rate Test | A | A | A | A | A | A | A | A | A | A | A | A |
| Odor Test | A | A | A | A | A | A | A | A | A | A | A | A |

As illustrated in Table 2, the low odor environmentally-friendly nano-pigment inkjet ink composition of the present invention can completely satisfy the requirements of an ink. The ink composition of the present invention is superior to the currently commercially available ink. The printhead nozzles are not easily clogged by such an inkjet ink composition. The inkjet ink composition without containing any hazardous substances does not have pungent odor, and can meet both the environmental requirement and the print quality requirement.

The experimental data of the comparative samples are illustrated in Tables 3 and 4 below. The comparative samples 1 to 5 have the advantages of poor printing quality, slow drying rate, and the occurrence of ink bleeding phenomenon. The comparative samples 1 to 5 are acidic, and the ink oblique ejection occurs. The pH values of comparative samples 6 and 7 containing relatively less acidity regulator are decreased, and however, the high-temperature stabilities of comparative samples 6 and 7 containing relatively more acidity regulator are poor. In the comparative sample 8, polyvinyl acetate resin has better abrasion resistance and better alcohol resistance than those of polyacrylic acid resin.

TABLE 3

| | Raw Material | | | | | | | |
|---|---|---|---|---|---|---|---|---|
| | Comparative Sample 1 | Comparative Sample 2 | Comparative Sample 3 | Comparative Sample 4 | Comparative Sample 5 | Comparative Sample 6 | Comparative Sample 7 | Comparative Sample 8 |
| Black Pigment Dispersion | 20 | 20 | 20 | 20 | 20 | 20 | 20 | 20 |
| Yellow Pigment Dispersion | — | — | — | — | — | — | — | — |
| Magenta Pigment Dispersion | — | — | — | — | — | — | — | — |
| Cyan Pigment Dispersion | — | — | — | — | — | — | — | — |
| N-Ethyl Pyrrolidone | — | 8 | — | 8 | 8 | 8 | 8 | 8 |
| Propylene Carbonate | — | — | 12 | 12 | — | 12 | 12 | 12 |
| Diethylene Glycol Ethyl Methyl Ether | 55 | 45 | 45 | 45 | 45 | 45 | 44.5 | 45 |
| Diethylene Glycol Diethyl Ether | 10.5 | 12.5 | 8.5 | 0.5 | 12 | — | — | — |
| Tetraethylene Glycol Dimethyl Ether | 6 | 6 | 6 | 6 | 6 | 6 | 6 | 6 |
| PVAc Resin | 4 | 4 | 4 | 4 | 4 | 4 | 4 | — |
| Polyacrylic Resin | — | — | — | — | — | — | — | 6 |
| Adipate Di-isononyl Ester | 4.4 | 4.4 | 4.4 | 4.4 | 4.4 | 4.4 | 4.4 | — |
| Alkyl Sulfonic Phenol Ester | — | — | — | — | — | — | — | 3 |
| 1-(2-Hydroxyethyl) Piperidine | — | — | — | — | 0.5 | 0.1 | 1.0 | 0.5 |
| N-Ethyl-4-piperidone | — | — | — | — | — | — | — | — |
| 1-Methyl-2-piperidine Methanol | — | — | — | — | — | — | — | — |
| Surfactant | 0.1 | 0.1 | 0.1 | 0.1 | 0.1 | 0.1 | 0.1 | 0.1 |
| Viscosity(25° C., cps) | 3.6 | 3.7 | 4.2 | 4.4 | 3.5 | 4.3 | 4.2 | 3.9 |
| Surface Tension (dyne/cm) | 28.2 | 28.7 | 29.2 | 29.6 | 28.6 | 29.9 | 29.9 | 29.8 |
| Average Particle Size (nm) | 105 | 100 | 105 | 102 | 102 | 101 | 106 | 101 |
| pH Value of Water Extraction | 5.5 | 5.7 | 5.5 | 6.0 | 8.0 | 7.2 | 8.3 | 7.8 |

TABLE 4

| | Test Item | | | | | | | |
|---|---|---|---|---|---|---|---|---|
| | Comparative Sample 1 | Comparative Sample 2 | Comparative Sample 3 | Comparative Sample 4 | Comparative Sample 5 | Comparative Sample 6 | Comparative Sample 7 | Comparative Sample 8 |
| pH Value Test | C | C | C | C | A | B | A | A |
| High-Temperature Stability Test | A | A | A | A | A | A | B | A |
| Low-Temperature Stability Test | A | A | A | A | A | A | A | A |
| Room-Temperature Printing Stability Test | B | B | B | A | B | A | A | A |
| Room-Temperature Nozzle Test | C | B | B | B | A | A | A | A |

TABLE 4-continued

| | Test Item | | | | | | | |
|---|---|---|---|---|---|---|---|---|
| | Comparative Sample 1 | Comparative Sample 2 | Comparative Sample 3 | Comparative Sample 4 | Comparative Sample 5 | Comparative Sample 6 | Comparative Sample 7 | Comparative Sample 8 |
| Printing Performance Test | C | B | C | A | B | A | A | A |
| Abrasion Resistance | A | A | A | A | A | A | A | B |
| Alcohol Resistance Test | A | A | A | A | A | A | A | B |
| Gloss Test | A | A | A | A | A | A | A | A |
| Drying Rate Test | C | B | C | A | B | A | A | A |
| Odor Test | A | A | A | A | A | A | B | A |

The weight percent ratios of the components of the inkjet ink composition of the present invention depend on the ink color and the specifications of the nozzles used. The inkjet ink composition of the present invention can be applied to the piezoelectric nozzles used in different brands of inkjet printers, and can be printed onto a PVC material substrate.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A nano-pigment inkjet ink composition that has a low odor and is environmentally-friendly, comprising, based on total weight of the inkjet ink composition:
   from 1 to 10 percent by weight of N-ethyl pyrrolidone;
   from 1 to 20 percent by weight of propylene carbonate;
   from 50 to 80 percent by weight of a glycol ether solvent;
   a pigment that is a nano-pigment having a nano-particle size;
   a dispersant;
   a resin;
   a plasticizer;
   a surfactant; and
   from 0.1 to 3.0 percent by weight of an acidity regulator that is at least one cyclic tertiary amine compound.

2. The nano-pigment inkjet ink composition as claimed in claim 1, wherein the acidity regulator comprises at least one compound selected from the group consisting of tertiary amine piperidines, tertiary amine piperidinols, tertiary amine piperidones, tertiary amine pyrrolidines, tertiary amine pyrrolidinols, tertiary amine pyrrolidones, and tertiary amine piperazines.

3. A nano-pigment inkjet ink composition that has a low odor and is environmentally-friendly, comprising:
   N-ethyl pyrrolidone;
   propylene carbonate;
   a glycol ether solvent;
   a pigment;
   a dispersant;
   a resin;
   a plasticizer;
   a surfactant; and
   from 0.1 to 3.0 percent by weight, based on total weight of the nano-pigment inkjet composition, of an acidity regulator that is at least one cyclic tertiary amine compound and that is selected from the group consisting of ethyl 1-methyl-piperidine-3-carboxylate, 1-(2-hydroxyethyl)-4-(3-hydroxypropyl)piperidine, 3-(1-piperidinylmethyl)phenol, 1-methyl-3-piperidinemethanol, 4,4'-trimethylene bis(1-piperidine ethanol), N-methyl-3-piperidinol, N-ethyl-3-piperidinol, 4-acetamido-1-benzylpiperidine, 1-methyl-2-piperidinemethanol, 1-(2-hydroxyethyl)piperidine, ethyl 1-piperidinepropionate, 1-piperidinepentanol, tropine, 1-(2-hydroxyethyl)-2,2,6,6-tetramethyl-4-piperidinol, 4-hydroxy-1,2,2,6,6,-pentamethylpiperidine, N-methyl-4-piperidone, N-ethyl-4-piperidone, 1-(2-phenylethyl)-4-piperidone, 1-benzyl-4-piperidone, 1,3-dimethyl-4-piperidone, tropanone, 1-(2-hydroxyethyl)pyrrolidine, 3-(dimethylamino)pyrrolidine, 1-pyrrolidino-1-cyclopentene, 1-pyrrolidino-1-cyclohexene, 1-ethyl-3-pyrrolidinol, 1-isopropyl-3-pyrrolidinol, 1-benzyl-3-pyrrolidone, and 1-acetyl-4-(4-hydroxyphenyl)piperazine.

4. The nano-pigment inkjet ink composition as claimed in claim 1, wherein the glycol ether solvent is represented by general formula (1) or (2) below:

$$R_1-O(CH_2CH-R_2O)_n-R_3 \quad (1)$$

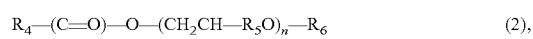

$$R_4-(C=O)-O-(CH_2CH-R_5O)_n-R_6 \quad (2),$$

where $R_1$, $R_2$, $R_3$, $R_4$, $R_5$, and $R_6$ are each independently hydrogen atoms or alkyl groups, and n is an integer from 2 to 5.

5. The nano-pigment inkjet ink composition as claimed in claim 1, wherein the inkjet ink composition has a viscosity at 25° C. that is 3.0 to 20 cps, and the inkjet ink composition has a surface tension that is 25 to 40 dyne/cm.

6. The nano-pigment inkjet ink composition as claimed in claim 1, wherein the resin is selected from the group consisting of polyvinyl acetate resin, polyamide resin, polyacrylic resin, epoxy resin, phenol resin, aldehyde ketone resin, phenolic resin, polyester resin, and cellulose resin.

7. The nano-pigment inkjet ink composition as claimed in claim 1, wherein the plasticizer is selected from the group consisting of tributyl citrate, acetyl tributyl citrate, and diisononyl adipate.

8. The nano-pigment inkjet ink composition as claimed in claim 1, wherein the pigment is an organic pigment or an inorganic pigment.

9. The nano-pigment inkjet ink composition as claimed in claim 2, wherein the acidity regulator adjusts the acidity of the nano-particle inkjet ink composition so that a water extraction from the nano-particle inkjet ink composition has a pH that ranges from 6.0 to 9.0.

10. The nano-pigment inkjet ink composition as claimed in claim 1, wherein the nano-pigment inkjet ink composition on a polyvinylchloride material has a flash point that is larger than or equal to 60° C. under atmospheric pressure.

11. The nano-pigment inkjet ink composition as claimed in claim 3, wherein the glycol ether solvent is represented by general formula (1) or (2) below:

$$R_1-O(CH_2CH-R_2O)_n-R_3 \quad (1)$$

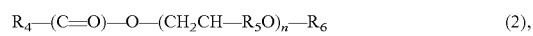

$$R_4-(C=O)-O-(CH_2CH-R_5O)_n-R_6 \quad (2),$$

where $R_1$, $R_2$, $R_3$, $R_4$, $R_5$, and $R_6$ are each independently hydrogen atoms or alkyl groups, and n is an integer from 2 to 5.

12. The nano-pigment inkjet ink composition as claimed in claim 3, wherein the inkjet ink composition has a viscosity at 25° C. that is 3.0 to 20 cps, and the inkjet ink composition has a surface tension that is 25 to 40 dyne/cm.

13. The nano-pigment inkjet ink composition as claimed in claim 3, wherein the resin is selected from the group consisting of polyvinyl acetate resin, polyamide resin, polyacrylic resin, epoxy resin, phenol resin, aldehyde ketone resin, phenolic resin, polyester resin, and cellulose resin.

14. The nano-pigment inkjet ink composition as claimed in claim 3, wherein the plasticizer is selected from the group consisting of tributyl citrate, acetyl tributyl citrate, and diisononyl adipate.

15. The nano-pigment inkjet ink composition as claimed in claim 3, wherein the pigment is an organic pigment or an inorganic pigment.

16. The nano-pigment inkjet ink composition as claimed in claim 3, wherein the acidity regulator adjusts the acidity of the nano-particle inkjet ink composition so that a water extraction from the nano-particle inkjet ink composition has a pH that ranges from 6.0 to 9.0.

17. The nano-pigment inkjet ink composition as claimed in claim 3, wherein the inkjet ink composition on a polyvinylchloride material has a flash point that is larger than or equal to 60° C. under atmospheric pressure.

* * * * *